June 29, 1954
M. STUBNITZ
2,682,296
SEAT BOTTOM SPRING
Filed Nov. 16, 1949
3 Sheets-Sheet 1
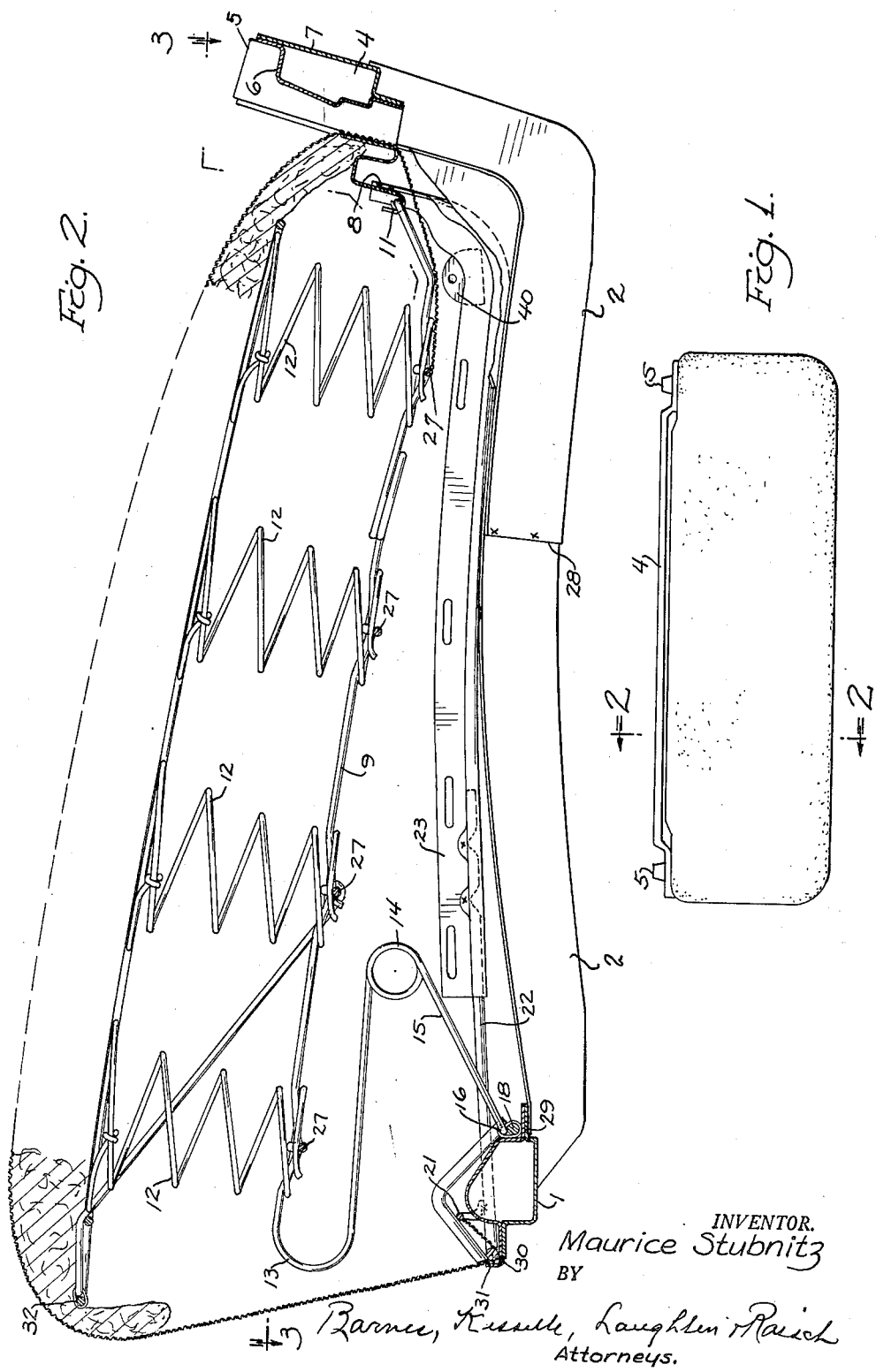
INVENTOR.
Maurice Stubnitz
BY
Barnes, Kisselle, Laughlin & Raisch
Attorneys.

June 29, 1954  M. STUBNITZ  2,682,296
SEAT BOTTOM SPRING
Filed Nov. 16, 1949  3 Sheets-Sheet 3
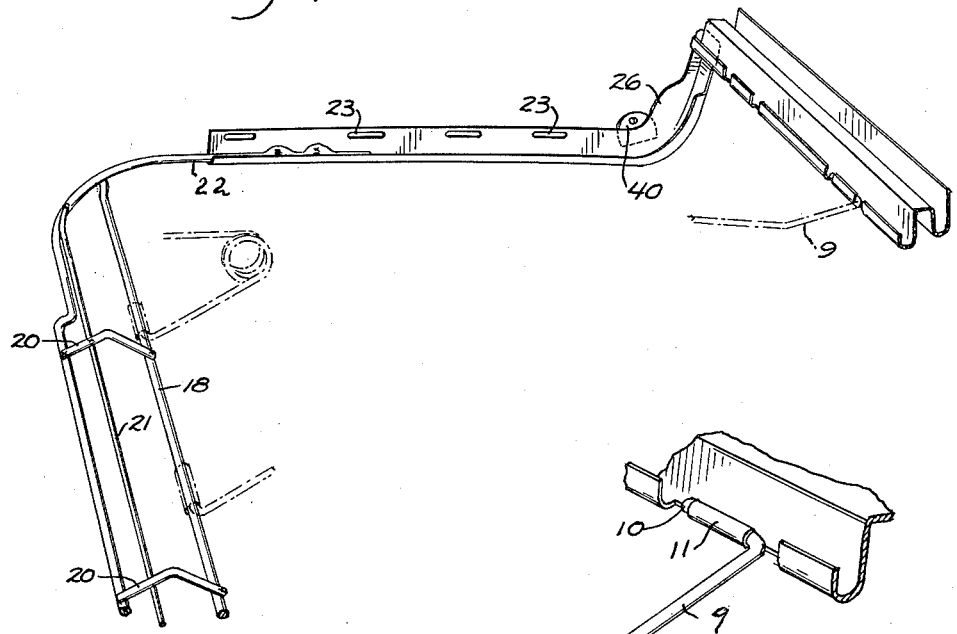
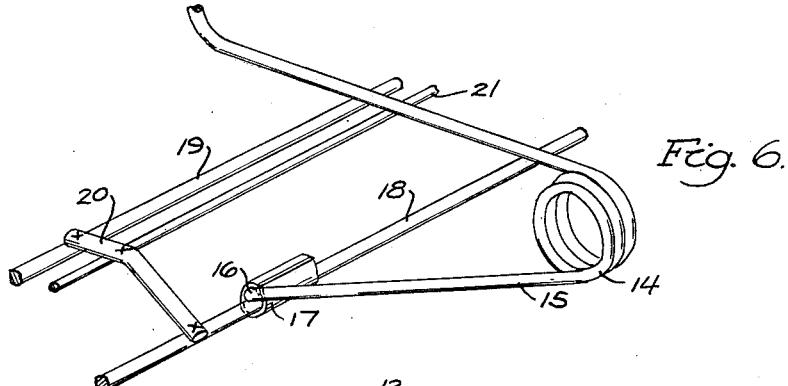
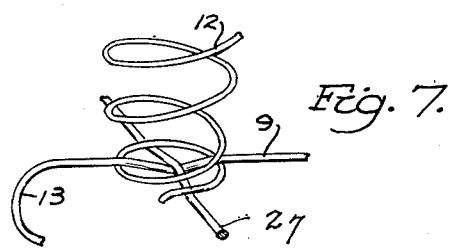
INVENTOR.
Maurice Stubnitz
BY
Barnes, Kisselle, Laughlin & Raisch
Attorneys.

Patented June 29, 1954

2,682,296

UNITED STATES PATENT OFFICE 2,682,296

SEAT BOTTOM SPRING

Maurice Stubnitz, Adrian, Mich., assignor to Stubnitz-Greene Spring Corporation, Adrian, Mich., a corporation of Michigan Application November 16, 1949, Serial No. 127,573

2 Claims. (Cl. 155—179)

This invention relates to seat springs for automobiles or other vehicles. It has for its object a seat spring which is removable from the seat frame and which can be constructed with minimum expense, and yet afford a maximum of comfort for the rider. There has recently come into use seat springs that are made of wavy or zig-zag wire. These seat springs lessen the cost of the spring as compared to the usual type of seat cushion, but they have disadvantages in discomfort for the rider and liability of the springs to break. It is the object of the present invention to afford an assembled seat spring unit that can be removably placed in the seat frame and which can be constructed at a price competitive with the wavy wire spring and at the same time affords greater comfort for one sitting in the seat, and very little liability of breakage.

Another feature of the present invention is that it affords clearance at the rear to accommodate the feet of one sitting in the back seat. In the late type of automobile bodies, there has been a tendency to shorten the distance between the front and rear seats for the purpose of bringing the rear seat forward of the rear axle as far as possible.

One of the features of my spring cushion involving the short length springs, the flexible stringers, and the jack knife spring support at the front is that a self dampening spring is afforded. The vibration amplitude and periods of the short coil springs and the flexing of the stringers are different, and the one vibration tends to dampen out the other and thereby avoids unnecessary jolting and throwing.

Referring to the drawings:

Fig. 1 is a small-sized plan view of the seat with the trimming in place.

Fig. 2 is an enlarged cross section taken on the line 2—2 of Fig. 1.

Fig. 4 is a fragmentary perspective of the seat cushion frame.

Fig. 5 is a detail in perspective of the attachment between the stringers and the back of the seat cushion frame.

Fig. 6 is a detail perspective of the attachment of the stringer at the front of the seat cushion frame.

Fig. 7 is a detail view of the attachment of one of the springs to the stringer.

Figure 3:
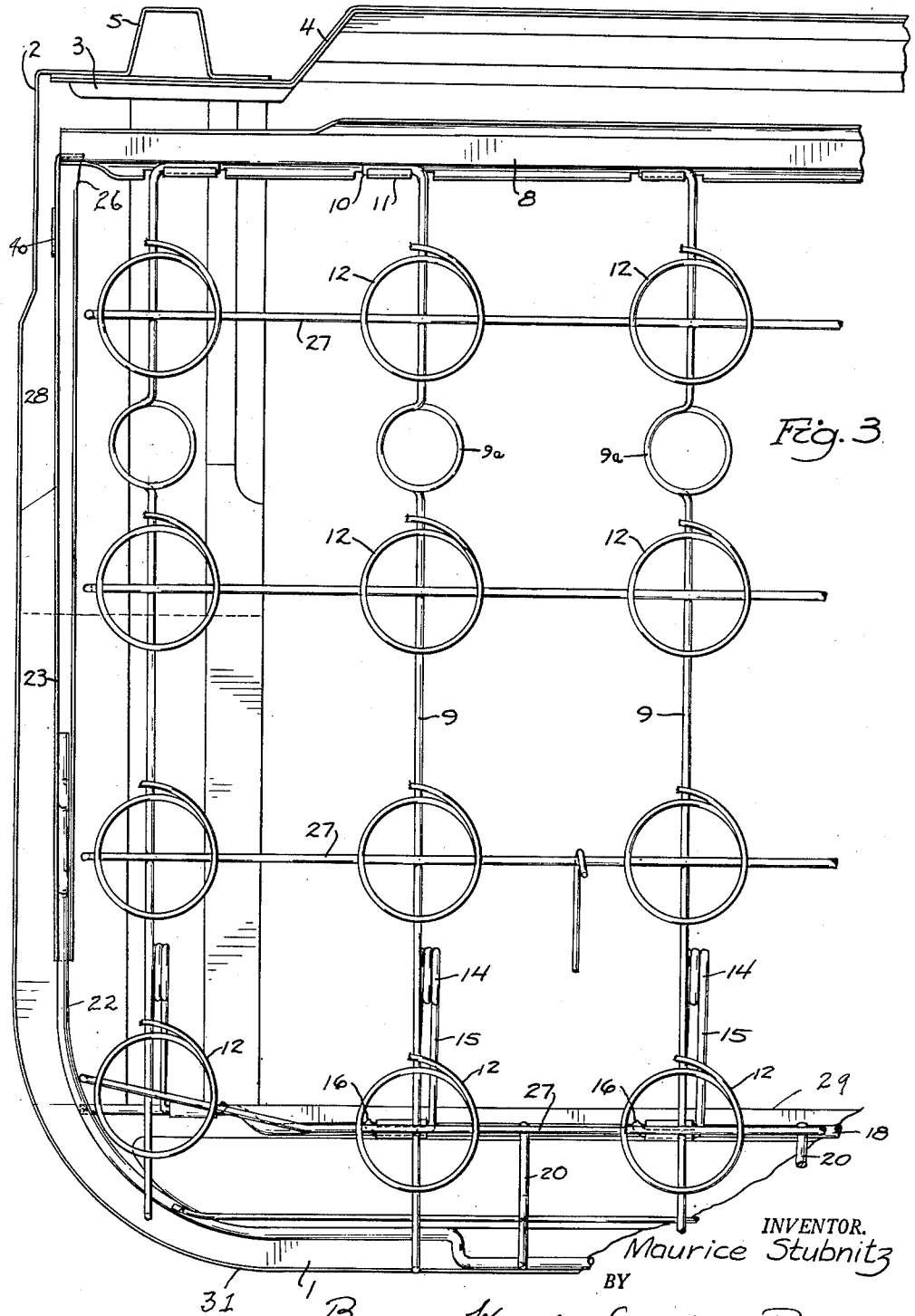
Fig. 3 is an enlarged fragmentary plan view of the seat with the upholstery removed, on line 3—3 of Fig. 2.

The front seat frame is ordinarily constructed by the body manufacturer out of sheet metal stampings. It comprises a pair of welded together channel stampings which form the front frame member 1. This front frame member is connected at its ends with angle strips 2 which form the side bars of the seat frame. These are turned in at the rear and lapped over the offset ends 3 of the rear seat bar 4. This lapped over end has a socket or channel portion 5 which is adapted to receive the projection of the seat back (not shown) which plugs into this socket to tie the seat back to the seat bottom frame. The rear frame member is provided by a channel 6 which is matched against and welded to angle strip 7 to form a hollow box-like cross section that provides a strong frame member to connect the bent over ends of the side frame member 2. This frame member is usually provided with rollers (not shown) by which the seat can be adjusted back and forth on a track on the floor pan (not shown).

The removable seat bottom spring unit has a double J frame member 8 at the rear. This double J frame or inverted channel with J type side walls supports at the rear the stringer wires or flexible spring beams 9 which are provided with bent over rear ends 10 that are clipped in place by pressing over cut out clip portions 11 of the front J of the rear frame. This is clearly shown in Fig. 5. These stringers 9 with the cross wires 27 are locked or knotted into the bottom whirl of the short coil spring 12. These stringers 9 are provided with flat coils 9a which give the stringers more flexibility at this point. These coil supporting springs 12 are of short length for economy. The short length springs can be tolerated because the stringers or spring beams 9 flex, not only due to the flexible character of the straight run of wire but by reason of the loop 13 at the front and the jack spring or safety pin spring 14 which is an integral continuation of the loop and stringer at the front. One leg 15 of the safety pin type of spring has a turned over portion 16 (see Fig. 6) which is clipped by clip 17 to the reinforcing wire 18. This wire 18 parallels the border wire 19 and is secured thereto by the V-shaped bridging wires 20 that are spot welded to the two wires and also to the trim wire 21. The wire 21 is provided so that the apron of the trimming may be turned under the border wire 19 and then looped over the trim wire 21 and secured thereto by hog rings (not shown) as in Fig. 2. The border wire 19 has the turned back legs 22 which are secured in a side frame bar of J cross section 23 (see Fig. 4). This J cross section strip has slots punched in the upright portion of the J. The trimming (not shown) at the end of the seat can be anchored to this J bar by hog rings. The trim material at the back of the seat is pulled inside of the uprights 26 of the side bars and around the outer J strip and thence is clipped to the rear cross stringer or trim wire 27 (see Fig. 2). In order to avoid weakening the J frame where it is bent, no slots are here punched in the J member but a slotted disk 40 is spot welded in place.

The seat frame at the sides, that is, the bars 2, are made up of two angle bars that are spot welded together at 28. The seat cushion unit rests with the reinforcing front cross wire 18 on the shelf 29 formed by the mating flanges of the front box-like frame member while the border wire 19 rests behind the upturned flange 31 of the mating flanges of the box-like cross section front frame member 1. These two shelves 29 and 30 form a rest for the two front cross wires that, with the bridge 20, straddle the top of the box section front frame member 1.

What I claim is:

1. A seat spring cushion having a base made up of side and rear frame members and a forward frame member made up of three wires, to wit: a forward border wire, an intermediate trim wire to which the trimming may be clipped, and a rear reinforcing wire, bridges connected to said three wires, safety pin springs clipped to said rear reinforcing wires, flexible stringers secured to the rear frame member and ending at the front in the said safety pin springs, short springs supported on said stringers for carrying the load of the seat, floating cross stringers laced into the coiled springs and the flexible stringers.

2. The combination claimed in claim 1 in which the trim wire is located above the front border wire and the rear reinforcing wire and in which the bridges are wire bent into angles and spot welded to the bridged wires.

References Cited in the file of this patent

UNITED STATES PATENTS

| Number | Name | Date |
|---|---|---|
| 742,251 | Staples | Oct. 27, 1903 |
| 813,923 | Staples | Feb. 27, 1906 |
| 1,915,390 | Steele et al. | June 27, 1933 |
| 2,199,382 | Widman | May 7, 1940 |
| 2,265,251 | Reed | Dec. 9, 1941 |
| 2,293,563 | Ruggles | Apr. 18, 1942 |
| 2,570,409 | Van Hove | Oct. 9, 1951 |
| 2,642,929 | Stubnitz | June 23, 1953 |
| 2,642,930 | Stubnitz | June 23, 1953 |